May 28, 1963 F. D. RUGG 3,091,480
UNIVERSAL COUPLING UNIT FOR VEHICLES
Filed July 7, 1961 2 Sheets-Sheet 1
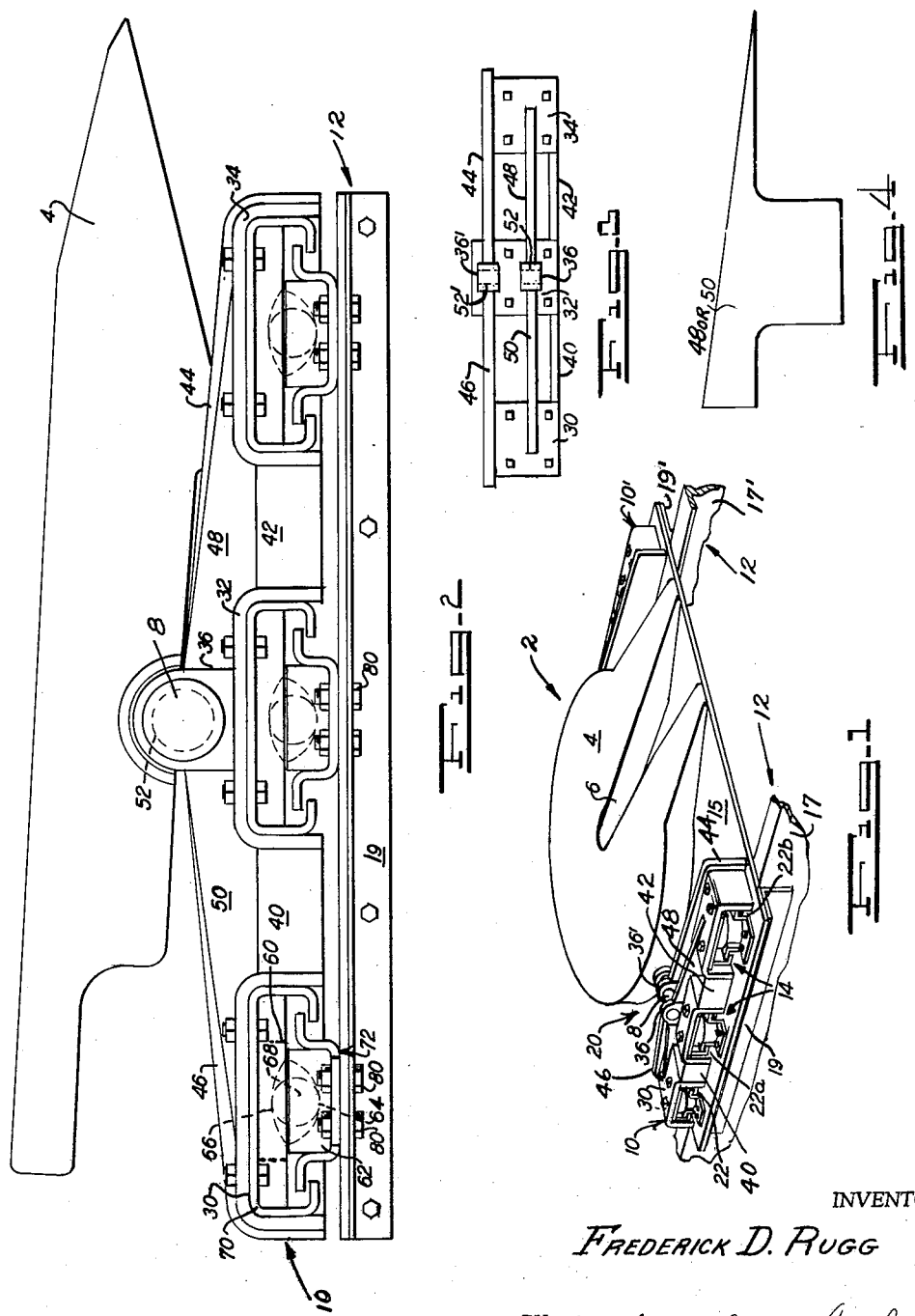
INVENTOR
FREDERICK D. RUGG
BY Cushman, Darby & Cushman
ATTORNEYS

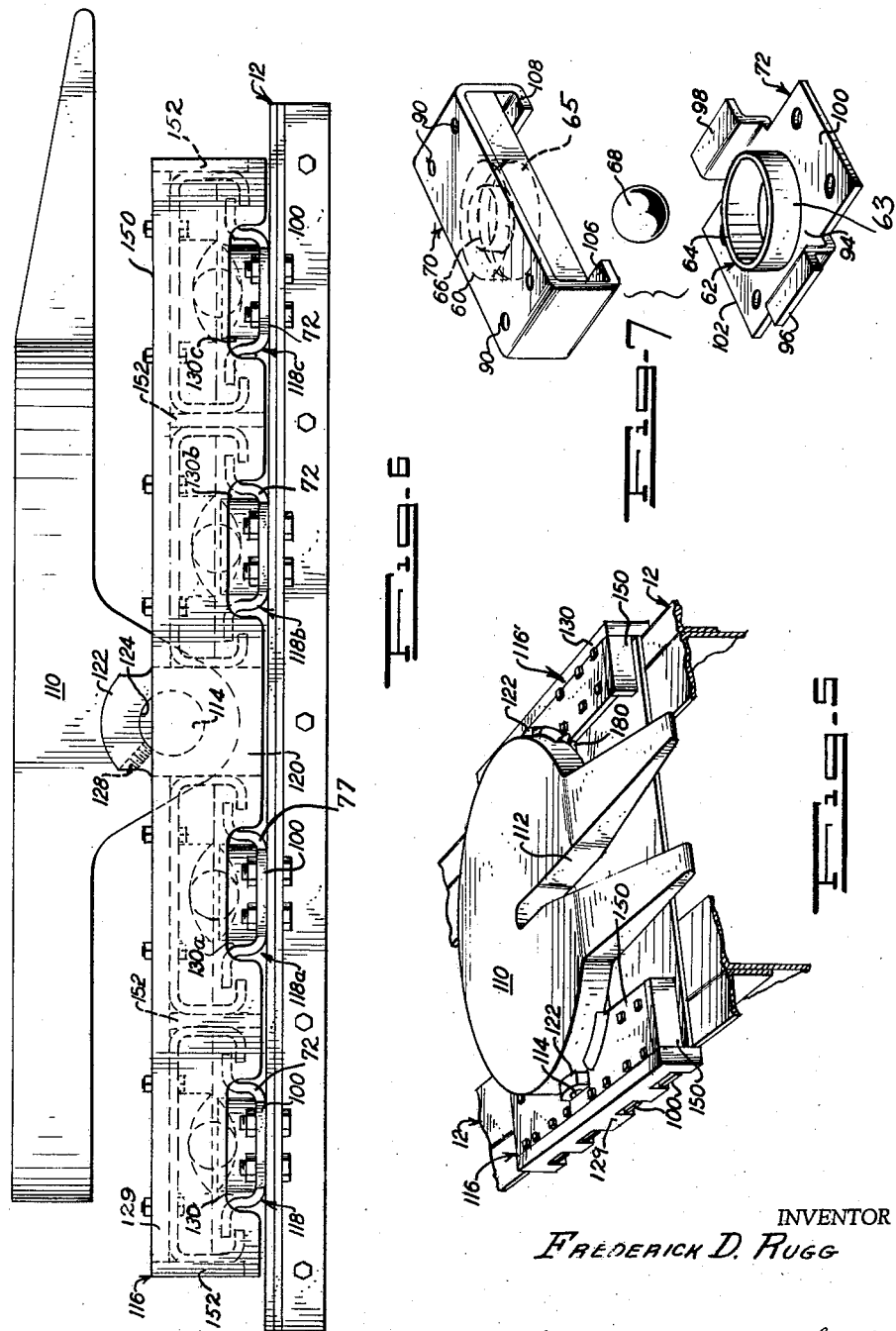

United States Patent Office 3,091,480
Patented May 28, 1963

3,091,480
UNIVERSAL COUPLING UNIT FOR VEHICLES
Frederick Daniel Rugg, East Bridgewater, Mass., assignor to Inertia-Matic, Inc., Watertown, Mass., a corporation of Massachusetts
Filed July 7, 1961, Ser. No. 122,574
10 Claims. (Cl. 280—438)

This application is a continuation-in-part of my copending applications Serial No. 22,064, filed April 13, 1960, and Serial No. 82,112, filed January 11, 1961 the latter application now abandoned.

This invention relates to freight-carrying vehicles, and particularly to the type of vehicle incorporating a fifth-wheel assembly for coupling the load-carrying section of the vehicle with the power drive section thereof. The invention finds particular utility when used with tractor-trailer units of the type now commonly employed to haul freight over the highways.

Tractor-trailer units employ fifth-wheel assemblies for coupling the trailer section with the tractor section so that the trailer section can be disconnected therefrom. In order to provide for some minor movements of the portions of the fifth-wheel assembly during coupling of the tractor with the trailer, and in order to reduce the shock in vibration transferred between separate sections of the tractor-trailer combination, various types of means have heretofore been suggested for use in coupling the fifth-wheel assembly to the tractor, and/or to the trailer. However, as explained in my prior application Serial No. 22,064, the prior art structures have not been effective in eliminating the drag of the trailer on the tractor. More particularly, in the prior art tractor-trailer combinations, the trailer has exerted certain forces on the tractor which tend to slow the tractor down with resultant utilization of excess fuel, and which otherwise decrease the overall efficiency of the unit.

In order to obtain greater efficiency in operation, less fuel consumption, less tire wear, greater driver safety and comfort, less engine and drive-line assembly strain, longer chassis and trailer life, longer brake life, and better protection of cargo, I suggested in my prior applications the provision of devices for mounting the fifth-wheel assembly whereby such assembly is universally movable with respect to either the tractor or trailer section of the particular transportation unit, and thus adapted to counteract the forces exerted by the trailer on the tractor during operation of the combination. In accordance with such suggestion, my prior applications referred to above are directed to particular structures and combinations which have proved in operation to provide for the improved results. Notwithstanding the satisfactory nature of the structures described and explained in such prior applications, however, it has been found that in certain instances problems are encountered because of space limitations in tractor-trailer assemblies.

More specifically, in certain types of tractor-trailer units, the fifth-wheel assembly incorporated on the original unit, or subsequently attached thereto and forming an essential part thereof, must be maintained at a certain vertical level for proper operation. Accordingly, in instances where such space limitations exist, frames and supports of the type heretofore suggested for incorporation in fifth-wheel assemblies having universal coupling units forming a part thereof, are not entirely satisfactory. Moreover, the brackets utilized in the coupling units themselves for attaching the same in position which have heretofore been developed are not entirely satisfactory in instances where space conservation is essential.

While I suggested in my prior application Serial No. 22,064 certain structural modifications which can be made in order to overcome space problems or satisfy space requirements, such suggestions have not met with widespread acceptance in the industry.

Realizing the aforesaid circumstances, the present invention has as its primary object the provision of an improved tractor-trailer coupling which achieves all of the results of my prior applications, and the particular advantages thereof, but which at the same time is readily adapted for use in tractor-trailer units wherein space requirements cause a serious problem.

Still a further, yet more specific object of the present invention is to provide in a tractor-trailer fifth-wheel connection supported on a tractor frame, the combination of a skid plate, skid plate pivot shaft connections projecting from opposite sides of the skid plate, a pair of elongate bracket members directly supporting the shaft connections projecting from opposite sides of the skid plate, and a plurality of universal couplings connected directly between each of the bracket members and the tractor frame. More generally, in this connection, it is an object of the present invention to provide such a combination including bracket members or cradles adapted to support the pivot shaft connections of a skid plate, and also adapted to be mounted on a frame by universal coupling units whereby the bracket members or cradles are universally movable with respect to the frame with which they are coupled.

Still other, yet even more specific and further objects of the present invention are: (a) to provide in a tractor-trailer fifth-wheel connection, a combination conforming with the preceding objects, wherein each of the universal couplings incorporated therein, comprises a pair of bearing cups having opposed curved complementary bearing faces, a ball member disposed between the bearing faces and movable thereover, a first cup bracket coupling one of the cups with one of the elongated bracket members or cradles and a second cup bracket coupling the other of the bearing cups with the frame whereby the elongated bracket members or cradles are universally movable with respect to the frame; (b) to provide such a combination wherein the universal coupling can take generally the form of any of those shown in my aforesaid co-pending applications, as well as those shown in United States Patent 2,867,472, issued January 6, 1959, to W. D. Harper, United States Patent No. 2,355,528, issued August 8, 1944, to W. D. Harper, and United States Patent No. 1,695,373, issued December 18, 1928, to W. D. Harper, all of which incorporate means limiting relative movement between the cups; (c) to provide such a combination which further includes an improved form of cup bracket adapted to minimize space requirements; (d) to provide such a combination wherein each of the elongated bracket members which are universally movable include shaft bearing means disposed centrally thereof, and a plurality of separate compartments therein adapted to, and in operation, housing the universal couplings; (e) to provide such a combination which further includes at least one cross bar fixed traversely between the elongated bracket members whereby such members are simultaneously movable with one another; (f) to provide such a combination wherein each of the bracket members are formed as weldments incorporating a plurality of structural elements jointed together to provide adequate support for the universal couplings connected in the compartments thereof, as well as adequate support for the bearings or coupling blocks cooperating with the skid plate pivot shaft connections; (g) to provide such a combination wherein each of the bracket members is so designed that the space between such bracket members and the associated frame to which it is coupled is a bare minimum; and (h) to provide an improved universal coupling unit adapted to be used in the combination provided hereby, which universal coupling unit generally conforms with those shown and described in my prior co-pending applications, as well as in the prior patents identified particularly above, but which incorporate a cup bracket formed from sheet stock, the stock comprising a generally cross-shape member including arms projecting from a central section thereof, one pair of opposed arms of the cross-shape member being bent first upwardly and then outwardly, and the other pair of opposed arms forming with the central section, the base of the bracket to which a cup is or can be easily attached.

The invention lies in the construction, combination and arrangement of the various components as explained more fully in the following detailed description of the illustrative and preferred embodiments of the invention. Such description refers to the annexed drawings wherein:

FIGURE 1 is a perspective view presenting a fifth-wheel assembly constructed in accordance with the preferred embodiment of the present invention;

FIGURE 2 is a side elevation of the assembly shown in FIGURE 1, FIGURE 2 presenting the structural details of the bracket members, universal couplings, and attachment of such components to the frame;

FIGURE 3 is a plan view of one of the elongated bracket members utilized in the assembly of FIGURE 1;

FIGURE 4 is a side view of a preferred form of support member incorporated in the assembly of FIGURE 1;

FIGURE 5 is a perspective view of a modified form of fifth-wheel assembly constructed in accordance with the present invention;

FIGURE 6 is a side view of the unit shown in FIGURE 5, FIGURE 6 presenting the structural details of the bracket members, universal couplings, and attachment of such components to the frame; and FIGURE 7 is an exploded view showing the preferred form of universal coupling assembly incorporated in the assemblies of FIGURES 1 and 5, and provided in accordance with the instant invention.

By referring to FIGURE 1, it will be noted that the fifth-wheel assembly shown therein has been generally designated by the numeral 2. Such assembly includes a fifth-wheel skid plate 4 having a conventional segmental longitudinally extending kingpin slot 6 therein.

Projecting from opposite sides of the skid plate 4 are skid plate pivot shaft connections 8. These connections can be part of a shaft extending under and across the skid plate 4 to pivotally mount the same, or they may be mere projecting lugs adapted to pivotally mount the skid plate. The particular form of skid plate pivot shaft connection forms no part of the instant invention, and it is to be understood that such connections may take any conventional form without departing from the scope and spirit of the invention. Similarly, the skid plate 4 may be of any conventional form without departing from the scope and spirit of the invention.

The fifth-wheel assembly 2 is shown as mounted on a frame 12 which comprises the frame of the normal tractor unit of a tractor-trailer combination. However, preferably such frame includes a pair of main right angle channel members 17 and 17'; a pair of auxiliary right angle channel members 19 and 19' attached to, and projecting from the sides of the main channel members, and a plate 15 extending over all such channel members.

As suggested above, a pair of bracket members generally designated by the numerals 10 and 10' form part of the fifth-wheel connection or assembly provided by the instant invention. The elongated bracket members 10 and 10' directly support the shaft connections 8 which project from opposite sides of the skid plate.

Each of the elongated bracket members 10 and 10' is coupled with the frame 12 by means of the universal couplings generally designated by the numeral 14. As stated, these couplings can take any of the various forms presented in my prior co-pending applications identified particularly above, or presented in the Harper patents identified more particularly above. However, as explained in more detail below, the invention provides an improved form of coupling unit bracket as one aspect hereof.

Each of the elongated bracket members or cradles 10 and 10' includes a shaft bearing means generally designated by the numeral 20 disposed centrally thereof, and a plurality of compartments 22, 22a and 22b therein. Each of the compartments houses one of the universal couplings 14.

If reference is now made to FIGURE 2, which presents the detailed construction of one of the bracket members shown in FIGURE 1, namely the bracket member 10, it will be noted that such bracket member comprises three inverted U-shaped longitudinally aligned channel members 30, 32 and 34. The U-shaped channel members are disposed with their open ends facing traversely of the longitudinal axis of the bracket member. The central U-shaped channel member 32 carries at least one bearing block 36, and as shown in FIGURE 1, preferably two bearing blocks 36 and 36'. A plurality of support plates extend between the channel members to support the channel members in spaced apart relation, and also to support the bearing blocks 36 and 36'.

As shown in FIGURES 1 and 3, the short plates 40 and 42 extend between the forward or outside face of the channel members 30 and 32 and 32 and 34 respectively. The central U-shaped channel member 32 is deeper than the other channel members 30 and 34, and extending between the rear end thereof and covering the rear end of the channel members 30 and 34 are a pair of support and cover plates 44 and 46. These support and cover plates 44 and 46 have straight lower edges, but upwardly tapering upper edges which join the bearing block 36' so as to properly support the same. Support for the bearing block 36 is obtained by means of the support plates 48 and 50 which extend from the sides bearing block 36 across and between the respective channel members.

The parts are preferably all welded together to form the assembly shown, and moreover each of the bearing blocks 36 and 36' is preferably provided with a bearing sleeve such as that designated by the numeral 52 and 52'. The bearing sleeves are conventional and adapted to receive the shaft projections extending from opposite sides of the skid plate 4.

The universal coupling units which are incorporated in each of the compartments of the elongated bracket members, or the cradle as it is referred to in the trade, comprise a pair of bearing cups 60 and 62 having opposed complementary bearing faces 64 and 66 with a ball member 68 disposed therebetween. The ball member is movable over the bearing faces, and a first cup bracket 70 serves to connect the upper cup member 60 with the associated cradle, or more particularly the channel member 30 thereof. A second cup bracket 72 supports the lower cup member 62 and serves as a means for connecting the same with the frame 12. The cup bracket 72 is provided with suitable apertures, which are adapted to be aligned with suitable apertures in the frame components, namely channel member 17 or 17', channel member 19 or 19', and plate member 15.

Passing between the aligned apertures in the lower bracket members 72 and cooperating or aligned apertures in the frame components are the bolts 80 which affix the brackets in proper position.

By reference to FIGURE 7 the preferred form of the lower cup bracket 72 and of the upper cup bracket 70 will be seen. The upper cup bracket comprises a generally C-shaped member having suitable apertures 90 therein for attaching the upper cup bracket 70 with the channel member 30, or more generally, the cradle or bracket member 10 as described above. The lower bracket member 72 is formed from sheet stock. The stock comprises a generally cross-shape member including arms projecting from the central section 94 thereof. One pair of the opposed arms, namely arms 96 and 98, are bent first upwardly and then outwardly, and the other pair of opposed arms, namely arms 100 and 102, form with the central section 94 the base of the bracket. As shown, the cups 64 and 66 are surrounded by sleeves 63 and 65 respectively. The upper sleeve 65 is adapted to surround the lower sleeve. The upwardly and outwardly bent arms 96 and 98 cooperate with the inwardly extending projections 106 and 108 of the upper bracket member 70, and the sleeves 63 and 65 cooperate with each other to provide a means for limiting relative movement between the cups. The exact manner of cooperation between these elements is described quite fully in both of the aforesaid co-pending applications identified above, as well as the prior Harper patents to which reference is made. The important point to note here, however, is that the bracket member 72 takes on a design different from the design shown in my prior co-pending applications and the Harper patents—a new design which is particularly important where space requirements impose definite limitations.

While in the preceding discussion, reference has only been made to one of the bracket members or cradles 10, it should be understood that the elongated bracket members are identical, and that thus the foregoing discussion applies with equal force to both the elongated bracket member 10 and the elongated bracket member 10'.

While the embodiment of the present invention presented in FIGURES 1 through 4 has proved to be satisfactory for certain installations, it has been found that for other installations the embodiment of FIGURE 5 is more suitable. In the embodiment of FIGURE 5, the skid plate has generally been designated by the numeral 110 and this skid plate is provided with a suitable kingpin receiving slot 112. Shaft connections 114 extend from opposite sides of the skid plate 110, and are received by the respective elongated bracket members 116, 116'.

By referring to FIGURE 6, it will be noted that the elongated bracket member 116 includes four separate compartments 118, 118a, 118b, and 118c, and that pairs of such compartments are disposed on opposite sides of a central section 120 which is adapted to receive the shaft connection 114. The central section 120 preferably is formed solidly and includes the upstanding projection 122. A suitable bore 124 extends through the upper portion of the central section 120 and is adapted to receive the shaft connection 114. A suitable lock screw 128 is preferably provided to fasten the shaft connections 114 in position. In this embodiment, the skid plate 110 is pivotally supported by a shaft running entirely across the plate, and projecting from opposite ends thereof. In contrast, in the embodiment of FIGURE 1, the shaft connections actually pivot in the bearing blocks.

As will be noted by particular reference to FIGURE 6, with the modified construction therein shown, the lower cup brackets 72, or more particularly the arm 100 thereof projects under the outside face of the bracket 116. At the same time, the plate 129 forming such face extends entirely across the elongated bracket member 116 to provide for adequate support between the compartments. The necessary cooperation is achieved by making plate 129 with a series of recesses 130, 130a, 130b, and 130c which receive the outwardly projecting arms 100 with the necessary clearance. It will be noted that the brackets 116 and 116' are identical and that each preferably includes, in addition to the side plate 129, a horizontal plate 150, and a plurality of section plates 152 which are disposed to provide for the plurality of compartments receiving the respective universal coupling units. Fixing of the components into the structure shown is also preferably achieved by welding in this embodiment. Moreover, in this embodiment, each of the universal coupling units is attached to the elongated bracket members and associated frame respectively in the same manner as that incorporated in the embodiment of FIGURES 1 through 4. Thus, detailed repetition of such connections is believed unnecessary. It is important to note, however, that each of the universal coupling units is received within its own compartment and that there is a minimum of clearance between the lower extremity of the elongated bracket member 116 and the members forming the frame of the tractor which has been generally designated by the numeral 12.

From the foregoing description it should be apparent that the elongated bracket members 116 and 116' of the embodiment of FIGURES 5 and 6, and 10 and 10' of the embodiment of FIGURES 1 and 2 serve not only to provide for support of the skid plate shaft connections, but in addition house the universal coupling units. In this manner, the universal coupling units cause a minimum of space displacement within a fifth-wheel assembly, and the normal level of such assembly as installed, can be maintained.

Both of the embodiments provided hereby preferably incorporate a crossbar extending between the respective elongated channel members to connect the same together and provide for simultaneous movement thereof. Such a crossbar is best shown in FIGURE 5 and designated by the numeral 180. It will be understood that other crossbars can be incorporated in instances where it is desired to provide for further support.

While both embodiments described above are stated to comprise elongated bracket members or cradles including a series of components welded together, it should be apparent that such brackets or cradles can be cast if desired, or otherwise suitably formed.

Having read the foregoing detailed description of the illustrative and preferred embodiments of the invention, one will readily understand that the objects set forth at the outset of the present specification have been successfully achieved. Various modifications, however, may occur to those of ordinary skill in the art after reading the preceding description, which modifications do not depart from the scope and spirit of the invention. Accordingly, what is claimed is:

1. In a tractor-trailer fifth-wheel connection supported on a tractor frame, the combination comprising a skid plate, skid plate pivot shaft connections projecting from opposite sides of said skid plate, a pair of elongate bracket members directly supporting said shaft connections projecting from opposite sides of said skid plate, and a plurality of universal couplings connected directly between each of said bracket members and said frame, each of said universal couplings comprising a pair of bearing cups having opposed curved complementary bearing faces, a ball member disposed between said bearing faces and movable thereover, a first cup bracket coupling one of said cups with one of said elongated bracket members, a second cup bracket coupling the other of said bearing cups with said frame whereby said elongated bracket members are universally movable with respect to said frame, and means for limiting relative movement between said cups.

2. In a tractor-trailer fifth-wheel connection supported on a tractor frame, the combination defined in claim 1 wherein said elongated bracket members each include a shaft bearing means disposed centrally thereof, and a plurality of separate compartments therein, each of said compartments housing one of said universal couplings.

3. In a tractor-trailer fifth-wheel connection supported on a tractor frame, the combination defined in claim 2 and further including at least one cross bar fixed traversely between said elongated bracket members whereby said members are simultaneously movable.

4. In a tractor-trailer fifth-wheel connection supported on the tractor frame, the combination defined in claim 2 wherein each of said bracket members includes at least three inverted U-shaped longitudinally aligned channel members, at least one shaft bearing block carried by the central one of said U-shape members, and a plurality of support plates extending between said channel members to support said channel members in spaced apart relation.

5. In a tractor-trailer fifth-wheel connection supported on a tractor frame, the combination defined in claim 4 wherein said central channel member is deeper than the other channel members, wherein said channel members extend parallel to the axes of said pivot shaft connections, wherein certain of said support plates extend between said channel members adjacent one edge of said bracket member, and wherein other of said support members extend between said other channel members and said central channel member and cover the other end of said other channel members.

6. In a tractor-trailer fifth-wheel connection supported on a tractor frame, the combination defined in claim 5 wherein said bearing block projects above said central channel member, wherein said other support members are fixed to said block, and wherein said combination further includes block supports extending from said bearing block across and between said channel members intermediate said support members.

7. In a tractor-trailer fifth-wheel connection supported on a tractor frame, the combination defined in claim 6 wherein each of said bracket members includes at least two aligned bearing blocks carried by said central inverted U-shape channel member and adapted to receive said shaft connections.

8. In a tractor-trailer fifth-wheel connection supported on a tractor frame, the combination defined in claim 2 wherein each of said elongate bracket members includes at least two separate compartments disposed on opposite sides of a central section adapted to receive one of said shaft connections.

9. In a tractor-trailer fifth-wheel connection supported on a tractor frame, the combination defined in claim 2 wherein each of said elongate bracket members includes at least four compartments, and a central section adapted to receive one of said shaft extensions, two of said compartments being disposed in adjacent relation on opposite sides of said central section.

10. In a tractor-trailer fifth-wheel connection supported on a tractor frame, the combination defined in claim 9 wherein said second cup bracket of each coupling projects under the outside face of the associated elongated bracket member, and wherein the outside face of said associated bracket member is recessed to receive said cup bracket.

References Cited in the file of this patent

UNITED STATES PATENTS

| | | |
|---|---|---|
| 1,695,373 | Harper | Dec. 18, 1928 |
| 2,794,656 | Seyferth | June 4, 1957 |
| 2,867,472 | Harper | Jan. 6, 1959 |